US012759245B2

(12) United States Patent
Savart et al.

(10) Patent No.: US 12,759,245 B2
(45) Date of Patent: Oct. 13, 2026

(54) METHOD FOR MANUFACTURING A FIBROUS MATERIAL WHICH IS MADE OF CONTINUOUS FIBRES AND IMPREGNATED WITH A THERMOPLASTIC POLYMER

(71) Applicant: ARKEMA FRANCE, Colombes (FR)

(72) Inventors: Thibaut Savart, Lacq (FR); Arthur Babeau, Lacq (FR); Axel Salinier, Lacq (FR)

(73) Assignee: ARKEMA FRANCE, Puteaux (FR)

( * ) Notice: Subject to any disclaimer, the term of this patent is extended or adjusted under 35 U.S.C. 154(b) by 267 days.

(21) Appl. No.: 18/258,093

(22) PCT Filed: Dec. 15, 2021

(86) PCT No.: PCT/FR2021/052332

§ 371 (c)(1),
(2) Date: Jun. 16, 2023

(87) PCT Pub. No.: WO2022/129781

PCT Pub. Date: Jun. 23, 2022

(65) Prior Publication Data

US 2024/0051240 A1 Feb. 15, 2024

(30) Foreign Application Priority Data

Dec. 17, 2020 (FR) .................................. FR2013435

(51) Int. Cl.
*B29C 70/16* (2006.01)
*B29C 35/02* (2006.01)
(Continued)

(52) U.S. Cl.
CPC .......... *B29C 70/16* (2013.01); *B29C 35/0244* (2013.01); *B29C 70/388* (2013.01);
(Continued)

(58) Field of Classification Search
CPC ....... B29C 70/16; B29C 70/388; B29C 70/56; B29C 35/0244; B29C 2035/0822;
(Continued)

(56) References Cited

U.S. PATENT DOCUMENTS 5,895,622 A 4/1999 Ramani et al.

FOREIGN PATENT DOCUMENTS

EP 1172191 A1 1/2002
EP 2788408 A1 10/2014
(Continued)

OTHER PUBLICATIONS

International Search Report (PCT/ISA/210) with translation and Written Opinion (PCT/ISA/237) mailed on Apr. 20, 2020, by the European Patent Office as the International Searching Authority for International Application No. PCT/FR2021/052332. (12 pages).

*Primary Examiner* — Christina A Johnson
*Assistant Examiner* — Xue H Liu
(74) *Attorney, Agent, or Firm* — Buchanan Ingersoll & Rooney PC

(57) ABSTRACT

Impregnation of a fibrous material made from continuous fibres with a thermoplastic polymer matrix, the fibrous material comprising a thermoplastic sizing polymer and, before impregnation, an initial width. The method comprises an expansion step which is carried out by means of at least two tensioning members (E) and a heating system SC for heating the tensioning members and/or the fibrous material, the expansion being from 1.5 to 5 times the initial width. The expanded fibrous material is cooled below the Tg of the thermoplastic sizing polymer by means of a cooling system before being brought into contact with the thermoplastic polymer matrix.

28 Claims, 7 Drawing Sheets

(51) Int. Cl.
*B29C 70/38* (2006.01)
*B29C 70/56* (2006.01)
*B29C 35/08* (2006.01)
*B29K 105/10* (2006.01)
*B29K 277/00* (2006.01)
*B29K 307/04* (2006.01)
*B29K 507/04* (2006.01)

(52) U.S. Cl.
CPC ...... *B29C 70/56* (2013.01); *B29C 2035/0822* (2013.01); *B29K 2105/10* (2013.01); *B29K 2277/00* (2013.01); *B29K 2307/04* (2013.01); *B29K 2507/04* (2013.01)

(58) Field of Classification Search
CPC ............ B29K 2105/10; B29K 2277/00; B29K 2307/04; B29K 2507/04
USPC .......................................................... 264/493
See application file for complete search history.

(56) References Cited

FOREIGN PATENT DOCUMENTS

| | | | |
|---|---|---|---|
| EP | 3170638 | A1 | 5/2017 |
| WO | 2018229114 | A1 | 12/2018 |
| WO | 2018234436 | A1 | 12/2018 |
| WO | 2018234439 | A1 | 12/2018 |

METHOD FOR MANUFACTURING A FIBROUS MATERIAL WHICH IS MADE OF CONTINUOUS FIBRES AND IMPREGNATED WITH A THERMOPLASTIC POLYMER

The present invention relates to a method for manufacturing a fibrous material which is made of continuous fibres and impregnated with a thermoplastic polymer.

More particularly, the invention relates to a method for manufacturing an impregnated fibrous material comprising a fibrous material made of continuous fibres and at least one thermoplastic polymer matrix, said fibrous material being sized by at least one sizing thermoplastic polymer and having, before its pre-impregnation with said thermoplastic polymer, an initial width I, and comprising a step of spreading said fibrous material before a pre-impregnation step. It also relates to the use of the above method for the manufacture of calibrated tapes suitable for the manufacture of three-dimensional composite parts and for composite parts as such.

In the present description, the expression "fibrous material" is understood to mean an assembly of reinforcing fibres. Before the shaping of said fibrous material, it is in the form of rovings. After the shaping thereof, it is in the form of tapes, strips or sheets. Their assembly constitutes a unidirectional reinforcement or a fabric or a nonwoven (NCF).

In the present description, the term "strip" is used to denote strips of fibrous material, the width of which is greater than or equal to 400 mm. The term "tape" is used to denote tapes with a calibrated width of less than or equal to 400 mm.

The quality of impregnation with thermoplastic polymers, in particular of high viscosity, on continuous reinforcing fibres to make thermoplastic pre-impregnated tapes requires perfect control of the amount of impregnated polymer and the quality of distribution of this polymer within the roving of continuous reinforcing fibres during the impregnation process.

Document EP1172191 describes a composite part comprising a size and a thermoplastic matrix and a method for manufacturing said part.

Document U.S. Pat. No. 5,895,622 also describes a composite part comprising a size and a thermoplastic matrix and a method for manufacturing said part.

Document EP3170638 also describes a composite part comprising a size and a thermoplastic matrix and a method for manufacturing said part.

Many patent applications in the prior art, such as WO2018/229114, WO2018/234436, WO2018/234439 and EP 2788408, describe spreading of the fibres as an essential parameter for obtaining a homogeneous quality of polymer impregnation within the fibres on the final tape. In particular, with reference to conventional impregnation processes such as aqueous or solvent-based dispersion of powders, but also and especially pre-impregnation in a fluidized bed of powders, it is essential to have a high degree of spreading of the fibre roving during the step of carrying away the polymer, in other words during immersion in the pre-impregnation tank. This spreading must be not only significant but also homogeneous over the width of the fibre roving and consistent overtime in the pre-impregnation tank to ensure good quality and good consistency of impregnation of the final tape.

In general, the spreading of reinforcing fibres, such as carbon fibres, is generated via mechanical, pneumatic and/or vibratory systems. The main drawback of these methods is that of generating misalignment of fibres within a roving (spreading by blow-out or suction) and/or mechanical damage to the fibres by applying too high a transverse stress.

The use of these conventional systems is generally not sufficient to maintain sufficient and sufficiently homogeneous and consistent spreading, in particular for sized fibres. This is especially the case for fibres having a thermoplastic size. This is because such a thermoplastic size is often dense and elastic and therefore allows only slight deformation under external stress. Moreover, since this size acts as a binder at room temperature between the filaments of the fibre roving, it is very difficult to achieve good spreading of a roving having this type of size. The spreading generated by this type of conventional system on thermoplastic sized fibre rovings is therefore poor, not homogeneous over the width of the fibre roving and is only short-lived and difficult to maintain. It is therefore not consistent over time.

This spreading must be generated as close as possible to the pre-impregnation tank to be advantageous and must also be maintained at a certain level during this pre-impregnation step without however mechanically damaging the fibre or misaligning the fibres within the roving. Furthermore, the systems currently used are generally bulky and/or unsuitable for the working conditions and environments (powder, solvent, water, temperature, etc.). They cannot therefore be as close as possible or even inside the pre-impregnation system.

There is therefore a need for a method making it possible to avoid the problems mentioned above.

The present invention relates to a method for manufacturing an impregnated fibrous material comprising a fibrous material made of continuous fibres and at least one thermoplastic polymer matrix, characterized in that said fibrous material is sized by a sizing thermoplastic polymer and has, before its pre-impregnation with said thermoplastic polymer, an initial width I, said method comprising a step of spreading said fibrous material before a pre-impregnation step, said spreading step being carried out by means of at least two tension devices (E) and at least one heating system SC for heating said tension devices and/or said fibrous material, said spreading, after said fibrous material has passed in contact with said tension devices, being between 1.5 and 5 times the initial width I, said spread fibrous material being cooled below the Tg of the sizing thermoplastic polymer by means of a cooling system before it is placed in contact with said thermoplastic polymer matrix in the pre-impregnation system to carry out the pre-impregnation step, the spreading being consistent and always representing 1.5 to 5 times the initial width I when said fibrous material is placed in contact with said thermoplastic polymer matrix in the pre-impregnation system.

The term "sizing" denotes the surface treatments applied to the fibrous materials during their manufacture of an organic nature (such as thermosetting resin or thermoplastic resin).

In the context of the present invention, said fibrous material is therefore sized with a thermoplastic resin which may be semicrystalline (sizes based on PEEK, PEKK or polyamide, for example) or amorphous (sizes based on PEI or polyamide, for example).

The thermoplastic resin is in particular a polyamide PA6 or PA66, generally of low molar mass. The size may also be of polypropylene (PP) type, in particular for glass fibres.

Said fibrous material comprises up to 3% by weight of said sizing thermoplastic resin.

The term "spreading" denotes the factor by which the width of the fibrous material (or roving) is increased relative to the initial width I of said roving, that is to say when said roving enters the system performing the spreading step.

Obviously, this is an average width (whether referring to the initial width or the width after spreading) of the roving, laid flat, determined by averaging measurements obtained without contact (LASER, LED, etc.) on several spools. The initial width does not necessarily correspond to the width of the roving at the outlet of the reels 11.

The spreading step is carried out before the pre-impregnation step, which means that the spreading step is carried out either upstream of the pre-impregnation system, and therefore outside said system, or within the pre-impregnation system and therefore inside but before the fibrous material is placed in contact with the thermoplastic polymer in solid or liquid (molten or dissolved) form or in suspension.

Spreading is carried out on the various tension devices E present which are located, as stated above, outside or inside the pre-impregnation system by means of a heating system SC for heating either the fibrous material or said tension devices E, or both.

Spreading depends on the fibrous material used and the various linear basis weights or title or titration or "tex" and/or the number in the rovings.

When said fibrous material passes in contact with said tension devices E, it is heated by said heating system either directly by said heating system SC, which is thus placed above the tension devices, or by said tension device, which is thus itself equipped with a heating system SC, or by both.

Heating said fibrous material allows the size to soften, thus leading to a wider spreading of said fibrous material, this spreading then being maintained throughout said spreading step. The spreading obtained after passing over the last tension device depends on the material used, but the spreading factor after passing over the last tension device is between 1.5 and 5 times the width of the fibrous material which came into contact with said first tension device.

The heating temperature used must be above the Tg of said thermoplastic polymer to cause softening of the size but must not exceed the Tm if the thermoplastic polymer used is semicrystalline. In any event, it must not exceed 200° C. for fibres with a polyamide size. The temperature is measured using a pyrometer or a thermal camera.

The Tm is determined by differential scanning calorimetry (DSC) according to the standard ISO 11357-3: 2013 and the Tg is determined by differential scanning calorimetry (DSC) according to the standard ISO 11357-2: 2013.

Before said spread fibrous material is placed in contact with the pre-impregnation system, that is to say before the sized, heated and spread fibrous material is placed in contact with the thermoplastic polymer matrix in solid or liquid (molten or dissolved) form or in suspension, in particular in solid powder form, said sized, heated and spread fibrous material is cooled by a cooling system which may be ambient air or forced air.

Cooling is carried out until the temperature of said fibrous material is below the Tg of said sizing thermoplastic polymer. The cooling temperature is measured using a pyrometer or a thermal camera.

The spreading of said fibrous material after cooling when said fibrous material is placed in contact with said thermoplastic polymer in the pre-impregnation system is thus always between 1.5 and 5 times the initial width I of said fibrous material.

The spreading of said fibrous material is therefore consistent between the end of said fibrous material passing in contact with said tension devices and the placing of said fibrous material in contact with said thermoplastic polymer matrix in the pre-impregnation system.

"Consistent" means that the spreading does not vary by more than 10% between the end of said fibrous material passing in contact with said tension devices and the placing of said fibrous material in contact with said thermoplastic polymer matrix in the pre-impregnation system.

This spreading is also homogeneous over the width of the fibre roving and consistent over time in the pre-impregnation tank to ensure good quality and good consistency of impregnation of the final impregnated fibrous material.

The inventors have therefore unexpectedly found that heating a fibrous material sized by a thermoplastic polymer and/or heating the tension devices with which said sized fibrous material is in contact makes it possible, on the one hand, to spread said fibrous material to a greater extent than without heating, and on the other hand to keep said spreading consistent and homogeneous during the spreading step but also to maintain this spreading after cooling and when placing said sized fibrous material in contact with said thermoplastic polymer matrix.

Regarding the Tension Devices

"Tension devices (E)" means any system over which the roving can pass. The at least two tension devices (E) may have any shape as long as the roving can pass over them.

They may be fixed or in rotation (or rotary), preferably in co-rotation and/or alternatively in controlled counter-rotation.

In one embodiment, said tension device is in controlled rotation, in particular such that the linear speed (in other words the tangential speed) at the surface of the tension device is less than twice the speed of the roving or greater than twice the speed of the roving.

This means, for controlled rotation, that the tangential speed at the surface of the tension device (E) is either equal to, greater than, or less than the speed of the roving.

Advantageously, the linear speed (in other words the tangential speed) at the surface of the tension device is less than twice the speed of the roving or greater than twice the speed of the roving.

More advantageously, the linear speed (in other words the tangential speed) at the surface of the tension device is less than twice the speed of the roving.

In one embodiment, the tangential speed of the tension devices is between 0.5 and 1.5 m/min, the speed of the roving being between 5 and 15 m/min.

The heating system is any system that releases heat or emits radiation capable of heating the fibrous material and/or the tension device (E). The tension devices (E) are therefore conductive or absorb the radiation emitted by the heat when they are heated at the same time as the fibrous material.

When only the fibrous material is heated, the tension devices are non-heat-conductive.

"Heat-conductive tension devices (E)" means that the tension device (E) consists of a material capable of absorbing and conducting heat and thus capable of heating up.

"Non-heat-conductive tension devices (E)" means that the tension device (E) consists of a material not capable of absorbing and conducting heat, thus preventing said tension devices (E) from heating up.

Said at least two tension devices (E) are located or included in the environment of the heating system, that is to say that they are not outside the heating system.

Said at least two tension devices (E) are thus entirely inside the heating system, but the heating system is not necessarily above them.

Advantageously, said heating system is above said at least two tension devices (E).

It would not be departing from the scope of the invention if the tension device (E) were positioned in a furnace comprising a heating system, for example an IR heating system, but said tension device were not positioned exactly under the heating elements which heat for example by IR. It would not be departing from the invention if the furnace included a convection heating mode and an IR heating system.

It would also not be departing from the invention if said tension device (E), placed in this furnace or in the environment of this furnace, were equipped with an independent heating means such as a resistor for heating said tension device (E), independently for example of the radiation from the IR lamps and the natural convection of the furnace and if, given the speed of the line, the polymer present in the tapes or the rovings were still in the molten state on coming into contact with said tension device.

The heating system SC and the at least two tension devices may be located outside or inside the pre-impregnation system.

When the heating system SC and the at least two tension devices are inside the pre-impregnation system, they are not in contact with the thermoplastic polymer, whatever form it is in (powder, aqueous or solvent-based dispersion or molten). The heating system SC and the at least two tension devices are therefore above the fluidized bed or the aqueous or solvent-based dispersion or the pultrusion system (molten route).

In a first variant, the heating system SC and the at least two tension devices are located outside the pre-impregnation system and said pre-impregnation step is carried out with a system chosen from among a fluidized bed, spraying through a nozzle, aqueous dispersion and the molten route, in particular at high speed, in particular pre-impregnation is carried out in a fluidized bed.

In another embodiment of this first variant, a single tension device is present under the heating system SC which thus corresponds to the first tension device, the second tension device being the roller (40) at the inlet of the tank.

In a second variant, the heating system SC and the at least two tension devices are located inside the pre-impregnation system and said pre-impregnation step is carried out with a system chosen from among a fluidized bed, spraying through a nozzle and aqueous dispersion, in particular pre-impregnation is carried out in a fluidized bed.

In another embodiment of this second variant, a single tension device is present under the heating system SC which thus corresponds to the second tension device, the first tension device being the roller (40) at the entrance to the tank.

In one embodiment of one or other of the above two variants, said at least two tension devices (E) conduct heat and a heating means SC is present and integrated in said at least two tension devices (E).

The integrated heating means may be a resistor which is placed inside the tension devices or the tension devices may be equipped with a double jacket in which a heated fluid circulates making it possible to regulate or thermostat the temperature of said tension devices (E).

In one embodiment of one or other of the above two variants, said at least two tension devices (E) conduct heat and a heating means SC is present above said at least two tension devices (E) for heating the fibrous material and said at least two tension devices (E).

Advantageously, the heating system is chosen from among an infrared lamp, a UV lamp and convection heating.

In one embodiment of one or other of the above two variants, said at least two tension devices (E) conduct heat and a heating means SC is present and integrated in said at least two tension devices (E) and a heating means SC is present above said at least two tension devices (E) for heating the fibrous material and said at least two tension devices (E).

In yet another embodiment, at least one of the tension devices (E) may be cooled to control the temperature of the fibrous material and in particular so as not to exceed 200° C. so as not to impair the sizing of said fibrous material.

Cooling may be carried out by blowing cooled air or by circulating a fluid cooled to the required temperature in at least one tension device provided with a double jacket.

In one embodiment of one or other of the above two variants, said at least two tension devices (E) do not conduct heat and a heating means SC is present above said at least two tension devices (E) for heating the fibrous material.

Advantageously, the at least two tension devices (E) are compression rollers of convex, concave or cylindrical shape, preferably cylindrical.

The number of rollers in contact with said fibrous material ranges from 2 to 20, in particular from 2 to 12, in particular from 2 to 9, preferably from 6 to 9.

Advantageously, the distance between two adjacent rollers ranges from 50 to 2000 μm, in particular from 50 to 500 μm, in particular from 50 to 120 μm. This distance may or may not be the same for all the tension devices concerned, one example of implementation can thus take the form of a system having a distance between two adjacent rollers of 1000 μm at the start of the spreading system (in the direction of travel of the roving) and a distance between two adjacent rollers of 200 μm at the end of the spreading system (in the direction of travel of the roving).

Advantageously, the rollers are cylindrical and have a diameter D ranging from 5 to 100 mm, in particular from 5 to 50 mm, notably from 10 to 30 mm.

Advantageously, the last roller of the spreading system when said rollers are on the outside or when only one roller is on the outside, the second being the edge of said tank, is at a distance from the fluidization tank, and therefore from the roller at the edge of the tank, of less than or equal to 30 cm. Over 30 cm, spreading is no longer consistent and decreases when the fibrous material enters said tank.

The distance i between two adjacent rollers having the same diameter can be calculated simply (μm):

$$i=((\sqrt{L^2+L'^2})-D\times 10000), \quad \text{[Math 1]}$$

i, expressed in μm, necessarily being a positive number, as the rollers cannot interpenetrate one another.

L: Distance between the centres of the two sets of rollers (mm)

L': distance between each adjacent roller (mm)

D: diameter of the rollers (mm)

This equation may apply regardless of the number of rollers, as long as they have the same diameter.

For rollers of different diameters but with each roller of each row being at the same level and having the same diameter, the equation is then:

$$L^2+L'^2=((D1+D2)/2+i)^2 \quad \text{[Math 2]}$$

D1: diameter of the rollers of the lower row in FIG. 7 (mm)

D2: diameter of the rollers of the upper row in FIG. 7 (mm)

Furthermore, owing to the presence of the tension devices as close as possible to the pre-impregnation system, and in particular as close as possible to where said fibrous material is placed in contact with said thermoplastic polymer of the matrix, said fibrous material is not misaligned and the number of tension devices prevents the fibre from breaking.

In one embodiment, said compression rollers are in co-rotation and/or in counter-rotation.

In another embodiment, said compression rollers are vibrating.

Said compression rollers may have a surface treatment and/or an apparent surface roughness minimizing friction with the reinforcing fibres.

Friction/tensile stress and mechanical damage to the fibre are thus limited by selecting a surface treatment for the compression rollers which minimizes friction with the fibre. The surface treatment may be Topocrom®, an aluminium and titanium oxide deposited on the rollers. These treatments can affect the apparent roughness of the compression roller and/or the "physico-chemical" nature of the contact (natural lubrication).

Advantageously, said rollers are separated from one another by a distance of less than 30 cm, in particular between D/2+1 mm and 30 cm, D being the diameter of the roller.

In one embodiment, the distance between the last roller and a point of contact between the reinforcing fibre and an element of the subsequent method is less than 30 cm.

This distance allows spreading to be maintained.

The height between the heating system and the tension devices ranges from 1 to 100 cm, preferably from 2 to 30 cm, in particular from 2 to 10 cm.

The heating system may be a horizontal system. However, the heating system or systems may be arranged vertically with the roving passing through the tension devices also vertically.

Regarding the Fibrous Material

Regarding the fibres constituting said fibrous material, these are especially fibres of mineral, organic or plant origin. Among the fibres of mineral origin, mention may be made of carbon fibres, glass fibres, silicon fibres, basalt or basalt-based fibres, or silica fibres, for example.

Among the fibres of organic origin, mention may be made of fibres based on a thermoplastic or thermosetting polymer, such as semiaromatic polyamide fibres, aramid fibres or polyolefin fibres for example.

Preferably, they are based on an amorphous thermoplastic polymer and have a glass transition temperature Tg above the Tg of the thermoplastic polymer or polymer blend constituting the pre-impregnation matrix when it is amorphous, or above the Tm of the thermoplastic polymer or polymer blend constituting the pre-impregnation matrix when it is semicrystalline. Advantageously, they are based on a semicrystalline thermoplastic polymer and have a melting temperature Tm above the Tg of the thermoplastic polymer or polymer blend constituting the pre-impregnation matrix when it is amorphous, or above the Tm of the thermoplastic polymer or polymer blend constituting the pre-impregnation matrix when it is semicrystalline. Thus, there is no risk of melting for the organic fibres constituting the fibrous material during impregnation by the thermoplastic matrix of the final composite.

Among the fibres of plant origin, mention may be made of natural fibres based on flax, hemp, lignin, bamboo, silk especially spider silk, sisal, and other cellulose fibres, in particular viscose fibres. These fibres of plant origin can be used pure, treated or else coated with a coating layer, for the purpose of facilitating the adhesion and impregnation of the thermoplastic polymer matrix.

The fibrous material may also be a fabric, braided or woven with fibres.

It may also correspond to fibres with support yarns.

These constituent fibres may be used alone or as mixtures. Thus, organic fibres may be mixed with mineral fibres in order to be pre-impregnated with thermoplastic polymer and form the pre-impregnated fibrous material.

Preferably the fibrous material consists of continuous fibres of carbon, of glass or of silicon carbide or a mixture thereof, in particular carbon fibres. It is used in the form of a roving or several rovings.

In the impregnated materials also referred to as "ready to use" materials, the impregnating thermoplastic polymer or polymer blend is distributed uniformly and homogeneously around the fibres. In this type of material, the impregnating thermoplastic polymer must be distributed as homogeneously as possible within the fibres in order to obtain a minimum amount of porosities, i.e. a minimum amount of voids between the fibres. Specifically, the presence of porosities in materials of this type may act as points of stress concentrations, when placed under mechanical tensile stress for example, and which then form points of failure initiation of the impregnated fibrous material and mechanically weaken it. A homogeneous distribution of the polymer or polymer blend therefore improves the mechanical strength and the homogeneity of the composite material formed from these impregnated fibrous materials.

Thus, in the case of "ready to use" impregnated materials, the content of fibres in said impregnated fibrous material is from 45% to 65% by volume, preferably from 50% to 60% by volume, especially from 54% to 60% by volume.

The measurement of the degree of impregnation may be carried out by image analysis (use of microscope or camera or digital camera, in particular) of a cross section of the tape, by dividing the surface area of the tape impregnated by the polymer by the total surface area of the product (impregnated surface area plus surface area of the porosities). In order to obtain a good quality image, it is preferable to coat the tape cut across its transverse direction with a standard polishing resin and to polish with a standard protocol enabling the observation of the sample with a microscope at least six times magnification.

Advantageously, the degree of porosity of said impregnated fibrous material is less than 10%, notably less than 5%, in particular less than 2%.

It should be noted that a degree of porosity of zero is difficult to achieve and that consequently, advantageously, the degree of porosity is greater than 0% but less than the degrees mentioned above.

The degree of porosity corresponds to the degree of closed porosity and may be determined either by electron microscopy, or as being the relative deviation between the theoretical density and the experimental density of said impregnated fibrous material as described in the examples section of the present invention.

The fibres which may form part of the composition of the fibrous materials may have different linear basis weights or title or titration or "tex" and/or be in different numbers in the rovings. Thus, the most conventionally used rovings are composed of 600 to 4800 tex for glass fibres and 3000 (3K), 6000 (6K), 12 000 (12K), 24 000 (24K), 48 000 (48K), 50 000 (50K) or 400 000 (400K) fibres for carbon fibres. Carbon fibres generally have a diameter close to 7-8 μm and glass fibres a diameter of approximately 13, 15, 17 or 20 μm, for example.

Obviously, the spreading depends on the number of fibres present in the fibrous material or the roving.

Thus, for a 12K roving the spreading represents from 2 to 3 times the initial width I, for a 24K roving the spreading represents from 2 to 4 times the initial width I and for a 50K roving the spreading represents from 1.5 to 2.5 times the initial width I.

Regarding the Thermoplastic Polymer of the Matrix

A thermoplastic, or thermoplastic polymer, is understood to mean a material which is generally solid at ambient temperature, which may be semicrystalline or amorphous, and which softens upon an increase in temperature, in particular after passing its glass transition temperature (Tg), and flows at higher temperature when it is amorphous, or may exhibit obvious melting on passing its melting temperature (Tm) when it is semicrystalline, and which becomes solid again during a reduction in temperature below its crystallization temperature (for a semicrystalline polymer) and below its glass transition temperature (for an amorphous polymer).

The Tg and Tm are determined by differential scanning calorimetry (DSC) according to the standards 11357-2: 2013 and 11357-3: 2013 respectively.

Regarding the polymer constituting the matrix for pre-impregnating the fibrous material, this is advantageously a thermoplastic polymer or a blend of thermoplastic polymers. This thermoplastic polymer or polymer blend can be ground in powder form, in order to be able to use it in a device such as a tank, in particular in a fluidized bed tank or in an aqueous dispersion.

The device in the form of a tank, in particular a fluidized bed tank, may be open or closed.

Optionally, the thermoplastic polymer or blend of thermoplastic polymers further comprises carbon-based fillers, in particular carbon black or carbon-based nanofillers, preferably chosen from carbon-based nanofillers, in particular graphenes and/or carbon nanotubes and/or carbon nanofibrils, or mixtures thereof. These fillers make it possible to conduct electricity and heat, and consequently make it possible to facilitate the melting of the polymer matrix when it is heated.

Optionally, said thermoplastic polymer comprises at least one additive, in particular chosen from a catalyst, an antioxidant, a heat stabilizer, a UV stabilizer, a light stabilizer, a lubricant, a filler, a plasticizer, a flame retardant, a nucleating agent, a chain extender and a dye, an electrically conductive agent, a thermally conductive agent, or a mixture of these.

Advantageously, said additive is chosen from a flame retardant, an electrically conductive agent and a thermally conductive agent.

According to another variant, the thermoplastic polymer or blend of thermoplastic polymers may further comprise liquid crystal polymers or cyclic polybutylene terephthalate, or mixtures containing same, such as the CBT100 resin marketed by Cyclics Corporation. These compounds make it possible in particular to fluidize the polymer matrix in the molten state, for a better penetration to the core of the fibres.

Depending on the nature of the polymer, or blend of thermoplastic polymers, used for producing the pre-impregnation matrix, in particular its melting temperature, one or other of these compounds will be chosen.

The thermoplastic polymers that are incorporated into the composition of the pre-impregnation matrix of the fibrous material, may be chosen from:

- polymers and copolymers from the family of aliphatic or cycloaliphatic polyamides (PAs) or semiaromatic PAs (also referred to as polyphthalamides (PPAs)),
- PEBAs,
- polyureas, in particular aromatic polyureas,
- polymers and copolymers from the family of acrylics such as polyacrylates, and more particularly polymethyl methacrylate (PMMA) or derivatives thereof,
- polymers and copolymers from the family of poly(aryl ether ketones) (PAEK) such as poly(ether ether ketone) (PEEK), or poly(aryl ether ketone ketones) (PAEKK) such as poly(ether ketone ketone) (PEKK) or derivatives thereof,
- aromatic polyetherimides (PEIs),
- polyaryl sulphides, in particular polyphenylene sulphides (PPSs),
- polyaryl sulphones, in particular polyphenylene sulphones (PPSUs),
- polyolefins, in particular polypropylene (PP),
- polylactic acid (PLA),
- polyvinyl alcohol (PVA),
  - fluoropolymers, in particular poly(vinylidene fluoride) (PVDF) or polytetrafluoroethylene (PTFE) or polychlorotrifluoroethylene (PCTFE), and mixtures thereof.

Advantageously, when said polymer is a blend of two polymers P1 and P2, the proportion by weight of polymer P1 and P2 is from 1-99% to 99-1%.

Advantageously, when said thermoplastic polymer is a blend, and the pre-impregnation process uses a dry powder, this blend is in the form of a powder obtained either by "dry blend" before introduction into the pre-impregnation tank or by "dry blend" carried out directly in the tank or by grinding of a compound carried out beforehand in an extruder.

Advantageously, this blend is composed of a powder obtained by "dry blend", before introduction into the tank or directly in the tank, and this blend of two polymers P1 and P2 is a blend of PEKK and PEI.

Advantageously, the PEKK/PEI blend is from 90-10% to 60-40% by weight, in particular from 90-10% to 70-30% by weight.

The thermoplastic polymer may correspond to the non-reactive final polymer that will impregnate the fibrous material or to a reactive prepolymer, which will also impregnate the fibrous material, but is capable of reacting with itself or with another prepolymer, as a function of the chain ends borne by said prepolymer, after pre-impregnation, or else with a chain extender and in particular during heating at the level of the tension devices in the furnace and/or during the processing of the tape in the final method for manufacturing the composite part.

The expression "non-reactive polymer" means that the molecular weight is no longer likely to change significantly, that is to say that its number-average molecular weight (Mn) changes by less than 50% when it is processed and therefore corresponds to the final polyamide polymer of the thermoplastic matrix.

Conversely, the expression "reactive polymer" means that the molecular weight of said reactive polymer will change during the processing by reaction of reactive prepolymers with one another by condensation or substitution, or with a chain extender by polyaddition and without elimination of volatile by-products, so as to give the final polyamide polymer (non-reactive) of the thermoplastic matrix.

According to a first possibility, said prepolymer may comprise or consist of at least one reactive prepolymer (polyamide) bearing on the same chain (that is to say, on the same prepolymer) two end functions X and Y' which functions are respectively co-reactive with one another by condensation, more particularly with X and Y' being amine and carboxyl or carboxyl and amine respectively. According to a second possibility, said prepolymer may comprise or consist of at least two polyamide prepolymers which are reactive with one another and which each respectively bear two end functions X or Y, which are identical (identical for the same prepolymer and different between the two prepolymers), said function X of one prepolymer being able to react only with said function Y of the other prepolymer, in particular by condensation, more particularly with X and Y' being amine and carboxyl or carboxyl and amine respectively.

According to a third possibility, said prepolymer may comprise or consist of at least one prepolymer of said thermoplastic polyamide polymer, bearing n reactive end functions X, chosen from: —$NH_2$, —$CO_2H$ and —OH, preferably $NH_2$ and —$CO_2H$ with n being 1 to 3, preferably from 1 to 2, more preferentially 1 or 2, more particularly 2 and at least one chain extender Y-A'-Y, with A' being a hydrocarbon biradical, bearing 2 identical reactive end functions Y, which are reactive by polyaddition with at least one function X of said prepolymer a1), preferably with a molecular weight of less than 500 and more preferentially of less than 400.

The number-average molecular weight Mn of said final polymer of the thermoplastic matrix is preferably within a range extending from 10 000 to 40 000, preferably from 12 000 to 30 000. These Mn values can correspond to inherent viscosities greater than or equal to 0.8, as determined in m-cresol according to the standard ISO 307:2007, but changing the solvent (use of m-cresol in place of sulphuric acid and the temperature being 20° C.).

Said reactive prepolymers according to the two options mentioned above have a number-average molecular weight Mn ranging from 500 to 10 000, preferably from 1000 to 6800, in particular from 2500 to 6800.

The Mns are determined in particular by calculation on the basis of the content of the end functions, determined by potentiometric titration in solution, and the functionality of said prepolymers. The weights Mn can also be determined by size exclusion chromatography or by NMR.

The nomenclature used to define polyamides is described in the standard ISO 1874-1:2011 "Plastics—Polyamide (PA) moulding and extrusion materials—Part 1: Designation", in particular on page 3 (tables 1 and 2), and is well known to those skilled in the art.

The polyamide may be a homopolyamide or a copolyamide or a blend thereof. Advantageously, the prepolymers constituting the matrix are chosen from polyamides (PAs), in particular chosen from aliphatic polyamides, cycloaliphatic polyamides, and semiaromatic polyamides (polyphthalamides) optionally modified by urea moieties, and copolymers thereof, polymethyl methacrylate (PPMA) and copolymers thereof, polyetherimides (PEIs), polyphenylene sulphide (PPS), polyphenylene sulphone (PPSU), PVDF, poly(ether ketone ketone) (PEKK), poly(ether ether ketone) (PEEK), fluoropolymers such as poly(vinylidene fluoride) (PVDF).

For the fluoropolymers, it is possible to use a homopolymer of vinylidene fluoride (VDF of formula $CH_2{=}CF_2$) or a copolymer of VDF comprising by weight at least 50% by weight of VDF and at least one other monomer copolymerizable with the VDF. The content of VDF must be greater than 80% by weight, or even better at 90% by weight, to ensure a good mechanical strength and chemical resistance for the structural part, especially when it is subjected to thermal and chemical stresses. The comonomer may be a fluoromonomer such as for example vinyl fluoride.

For structural parts that have to withstand high temperatures, besides the fluoropolymers, use is advantageously made according to the invention of PAEKs (polyaryl ether ketones) such as poly(ether ketone)s (PEKs), poly(ether ether ketone) (PEEK), poly(ether ketone ketone) (PEKK), poly(ether ketone ether ketone ketone) (PEKEKK) or PAs having high glass transition temperature Tg.

Advantageously, said thermoplastic polymer is a polymer having a glass transition temperature such that Tg 80° C., notably 100° C., in particular 120° C., notably 140° C., or a semicrystalline polymer having a melting temperature Tm 150° C.

Advantageously, said thermoplastic polymer of the matrix is a non-reactive thermoplastic polymer.

Advantageously, said at least one thermoplastic prepolymer is selected from polyamides, PEKK, PEI and a blend of PEKK and PEI.

Advantageously, said polyamide is chosen from aliphatic polyamides, cycloaliphatic polyamides and semiaromatic polyamides (polyphthalamides).

Advantageously, said aliphatic polyamide prepolymer is chosen from:

polyamide 6 (PA6), polyamide 11 (PA11), polyamide 12 (PA12), polyamide 66 (PA66), polyamide 46 (PA46), polyamide 610 (PA610), polyamide 612 (PA612), polyamide 1010 (PA1010), polyamide 1012 (PA1012), polyamide 11/1010 and polyamide 12/1010, or a blend thereof or a copolyamide thereof, and block copolymers, notably polyamide/polyether (PEBA), and said semiaromatic polyamide is a semiaromatic polyamide optionally modified by urea moieties, notably a PA MXD6 and a PA MXD10 or a semiaromatic polyamide of formula X/YAr, as described in EP 1 505 099, especially a semiaromatic polyamide of formula A/XT wherein A is chosen from a moiety obtained from an amino acid, a moiety obtained from a lactam and a moiety corresponding to the formula (Ca diamine).(Cb diacid), with a representing the number of carbon atoms of the diamine and b representing the number of carbon atoms of the diacid, a and b each being between 4 and 36, advantageously between 9 and 18, the (Ca diamine) moiety being chosen from linear or branched aliphatic diamines, cycloaliphatic diamines and alkylaromatic diamines and the (Cb diacid) moiety being chosen from linear or branched aliphatic diacids, cycloaliphatic diacids and aromatic diacids, X.T denotes a moiety obtained from the polycondensation of a Cx diamine and terephthalic acid, with x representing the number of carbon atoms of the Cx diamine, x being between 6 and 36, advantageously between 9 and 18, especially a polyamide of formula A/6T, A/9T, A/10T or A/11T, A being as defined above, in particular a polyamide PA 6/6T, a PA 66/6T, a PA 61/6T, a PA MPMDT/6T, a PA PA11/10T, a PA 11/6T/10T, a PA MXDT/10T, a PA MPMDT/10T, a PA BACT/10T, a PA BACT/6T, PA BACT/10T/6T, PA BACT/10T/11, PA BACT/6T/11.

T corresponds to terephthalic acid, MXD corresponds to m-xylylenediamine, MPMD corresponds to methylpentamethylenediamine and BAC corresponds to bis(aminomethyl) cyclohexane.

Advantageously, the thermoplastic polymer is a semiaromatic polyamide.

Advantageously, the thermoplastic polymer is a semiaromatic polyamide chosen from a PA MPMDT/6T, a PA PA11/10T, a PA 11/6T/10T, a PA MXDT/10T, a PA MPMDT/10T, a PA BACT/10T, a PA BACT/6T, PA BACT/10T/6T, PA BACT/10T/11, PA BACT/6T/11.

Regarding the Pre-Impregnation Step:

The pre-impregnation step, as stated above, may be carried out according to techniques well known to those skilled in the art and in particular chosen from those described above.

In one advantageous embodiment, the pre-impregnation step is carried out with a system chosen from among a fluidized bed, spraying through a nozzle and the molten route, in particular at high speed, in particular impregnation is carried out in a fluidized bed.

Advantageously, pre-impregnation is carried out with a system chosen from among a fluidized bed, spraying through a nozzle and the molten route, in particular at high speed, in particular impregnation is carried out in a fluidized bed and one or more tension device(s) (E") is(are) present upstream of said system.

It should be noted that the tension devices (E) and (E") may be identical or different, whether in terms of material or shape and its characteristics (diameter, length, width, height, etc., depending on the shape).

They may be at the same level or at different levels. This latter case is shown for example in FIG. 7.

The fluidized bed pre-impregnation process is described in WO 2018/115736.

Advantageously, the pre-impregnation step is carried out in a fluidized bed.

An example of a unit for implementing a manufacturing method without the heating step by means of at least one tension device is described in international application WO 2015/121583.

This system describes the use of a tank comprising a fluidized bed to carry out the pre-impregnation step and can be used within the context of the invention.

Advantageously, the tank comprising the fluidized bed is provided with at least one tension device (E') which may be a compression roller.

It should be noted that the tension devices (E) and (E') may be identical or different, whether in terms of material or shape and its characteristics (diameter, length, width, height, etc., depending on the shape).

However, the tension device (E') is neither a heating device nor is it heated.

The step of pre-impregnation of the fibrous material is carried out by passing one or more rovings through a continuous pre-impregnation device, comprising a tank (10), fitted with at least one tension device (E') and comprising a fluidized bed (12) of powder of said polymer matrix.

The powder of said polymer matrix or polymer is suspended in a gas G (air for example) introduced into the tank and flowing into the tank (10) through a hopper (11).

The roving(s) is (are) circulated through this fluidized bed (12).

The tank may have any shape, especially cylindrical or parallelepipedal, in particular a rectangular parallelepiped or a cube, advantageously a rectangular parallelepiped.

The tank (10) can be an open or closed tank. Advantageously, it is open.

In the case where the tank is closed, it is then equipped with a sealing system so that the powder of said polymer matrix cannot leave said tank.

This pre-impregnation step is therefore carried out by a dry route, that is to say that the thermoplastic polymer matrix is in powder form, especially in suspension in a gas, in particular air, but cannot be in dispersion in a solvent or in water.

Each roving to be pre-impregnated after passing over the tension devices (E) enters the fluidized bed.

The fibre roving or parallel fibre rovings then goes or go into a tank (10), comprising in particular a fluidized bed (12), fitted with at least one tension device (E') which is a compression roller or is already present in the tank and then enters the fluidized bed (12), fitted with at least one tension device (E').

The fibre roving or parallel fibre rovings then emerge(s) from the tank after pre-impregnation after optional controlling of the residence time in the powder.

The process of pre-impregnation by spraying through a nozzle is described in WO 2018/115739.

The process of pre-impregnation by the molten route is described in WO 2018/234439.

Advantageously, the pre-impregnation step is carried out by the molten route, in particular by pultrusion.

Molten pre-impregnation techniques are well known to those skilled in the art and are described in the above references.

The pre-impregnation step is carried out in particular by crosshead extrusion of the polymer matrix and passage of said roving or said rovings through this crosshead and then passage through a heated die, the crosshead possibly being provided with fixed or rotating tension devices over which the roving passes, thus causing spreading of said roving, enabling pre-impregnation of said roving.

Pre-impregnation may also be carried out as described in US 2014/0005331 A1 with the difference that resin is supplied on both sides of said roving and that there is no contact surface eliminating part of the resin on one of the two surfaces.

Advantageously, the pre-impregnation step is carried out by the molten route at high speed, that is to say with said roving or rovings passing at a speed greater than or equal to 5 m/min, in particular greater than 9 m/min.

In one embodiment, the method according to the invention comprises a step of heating the pre-impregnated fibrous material to melt the thermoplastic polymer of the matrix and to finalize the impregnation of said fibrous material.

In another embodiment, the method according to the invention comprises a step of heating the pre-impregnated fibrous material to melt and polymerize the thermoplastic prepolymer of the matrix optionally with said extender and to finalize the impregnation of said fibrous material.

Said heating step can be performed as described in WO 2018/234439: A first heating step may immediately follow the pre-impregnation step or else other steps may occur between the pre-impregnation step and the heating step, whatever the system chosen to carry out the pre-impregnation step, and in particular with a system chosen from among a fluidized bed, spraying through a nozzle and the molten route, in particular at high speed, in particular a fluidized bed.

Advantageously, said first heating step immediately follows the pre-impregnation step.

The expression “immediately follows” means that there is no intermediate step between the pre-impregnation step and said heating step.

Advantageously, a single heating step is carried out, which immediately follows the pre-impregnation step.

Advantageously, said at least one heating system is chosen from an infrared lamp, a UV lamp and convection heating.

Since the fibrous material is in contact with the tension device(s) in the heating system, and the tension device is conductive, the heating system is therefore also performed by conduction.

Advantageously, said at least one heating system is chosen from an infrared lamp.

Advantageously, said at least one tension device (E") is a compression roller of convex, concave or cylindrical shape.

It should be noted that the compression rollers corresponding to the tension devices (E), (E') and (E") may be identical or different, whether in terms of material or shape and its characteristics (diameter, length, width, height, etc., depending on the shape).

The convex shape is favourable to spreading whereas the concave shape is unfavourable to spreading although it nevertheless occurs.

The at least one tension device (E") may also have a shape that alternates between convex and concave. In this case, the passing of the roving over a compression roller of convex shape causes spreading of said roving and then the passing of the roving over a compression roller of concave shape causes contraction of the roving and so on, making it possible if necessary to improve the homogeneity of impregnation, in particular to the core.

The expression "compression roller" means that the passing roving presses partially or completely against the surface of said compression roller, which induces spreading of said roving.

The rollers may be free (rotating) or fixed.

They may be smooth, ribbed or grooved.

Advantageously, the rollers are cylindrical and ribbed. When the rollers are ribbed, two ribs may be present in opposite directions from one another starting from the centre of said roller, thus allowing the rovings to be moved away toward the outside of the roller, or in opposite directions from one another starting from the outside of said roller, thus making it possible to bring the rovings toward the centre of the roller.

This heating step makes it possible to make pre-impregnation uniform, to thus finalize impregnation and to thus have impregnation to the core and a high content of fibres by volume, in particular consistent in at least 70% of the volume of the strip or tape, notably in at least 80% of the volume of the strip or tape, in particular in at least 90% of the volume of the strip or tape, more particularly in at least 95% of the volume of the strip or tape, and also to decrease the porosity.

The spreading depends on the fibrous material used. For example, the spreading of a carbon fibre material is much greater than that of a flax fibre.

The spreading also depends on the number of fibres in the roving, on their average diameter and on their cohesion due to the size.

The diameter of said at least one compression roller (tension device (E")) is from 3 mm to 100 mm, preferentially from 3 mm to 20 mm, in particular from 5 mm to 10 mm. Below 3 mm, the deformation of the fibre induced by the compression roller is too great.

Advantageously, the compression roller is cylindrical and non-grooved and in particular is made of metal.

Advantageously, said at least one tension device (E") consists of at least one compression roller of cylindrical shape.

Advantageously, said at least one tension device (E") consists of from 1 to 15 compression rollers (R1 to R15) of cylindrical shape, preferably from 3 to 15 compression rollers (R3 to R15), in particular from 6 to 10 compression rollers (R6 to R10).

Obviously, whatever the number of tension devices (E") present, they are all located or included in the environment of the heating system, that is to say that they are not outside the heating system.

According to another aspect, the present invention relates to the use of the method as defined above for the manufacture of calibrated tapes suitable for the manufacture of three-dimensional composite parts, by automated layup of said tapes using a robot.

In another embodiment, said composite parts relate to the fields of transport, in particular motor vehicle transport, of oil and gas, in particular offshore, of hydrogen, of gas storage, in particular hydrogen, aeronautical, nautical and railroad transport; of renewable energy, in particular wind turbine or marine turbine, energy storage devices, solar panels; thermal protection panels; sports and leisure, health and medical, and electronics.

According to another aspect, the present invention relates to a three-dimensional composite part, characterized in that it results from the use of the method as defined above.

Figure 1:
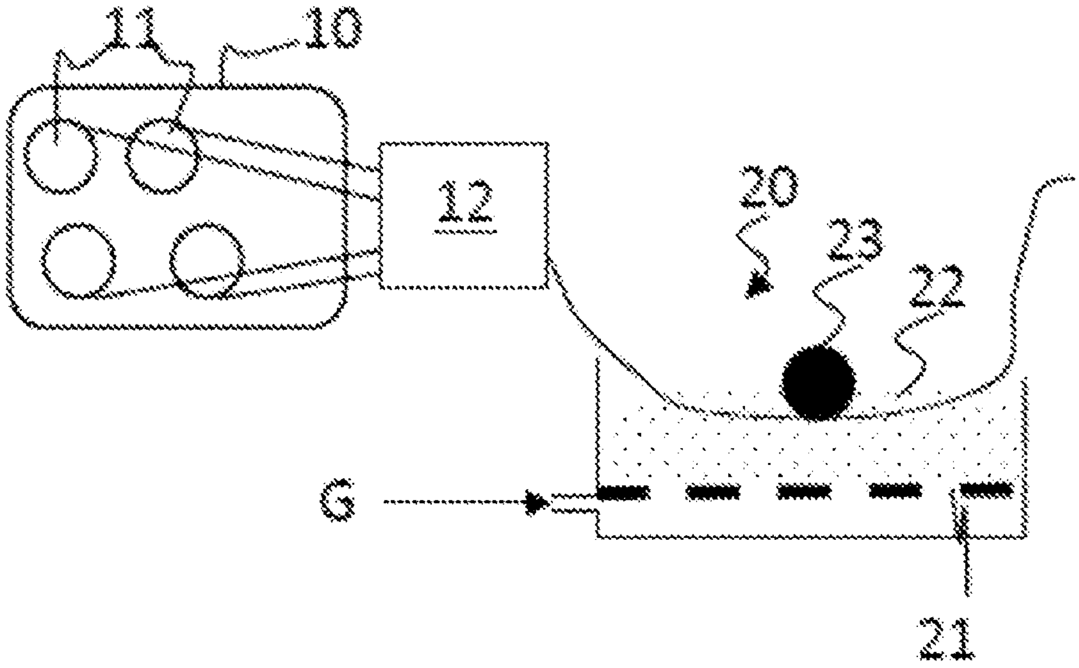
FIG. 1 presents a partial diagram of a unit for implementing the method for manufacturing a pre-impregnated fibrous material according to WO 2018/115736.

Each roving to be impregnated is unwound from a device 10 with reels 11 under the tension generated by rolls (not shown). The device 10 comprises a plurality of reels 11, each reel making it possible to unwind one roving to be impregnated. Thus, it is possible to impregnate several fibre rovings simultaneously. Each reel 11 is provided with a brake (not shown) so as to apply a tension to each fibre roving. In this case, an alignment module 12 makes it possible to position the fibre rovings parallel to one another. In this way, the fibre rovings cannot be in contact with one another, which makes it possible to prevent mechanical damage to the fibres in particular.

The fibre roving or parallel fibre rovings then pass into a tank 20 with a fluidized bed 22 provided with at least one tension device (E') (23), in particular a compression roller. The polymer powder is suspended in a gas G (air for example) introduced into the tank and flowing into the tank through a hopper 21. The roving(s) is (are) circulated through this fluidized bed 22.

Figure 2:
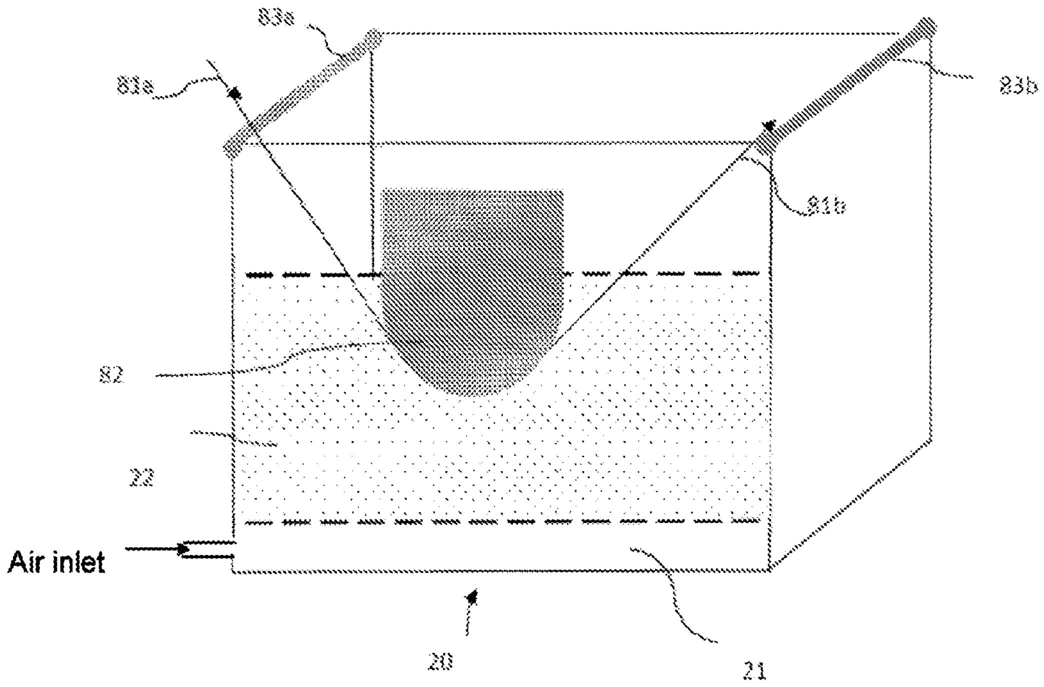

FIG. 2 presents a tank comprising a fluidized bed provided with at least one tension device (E') which may be a compression roller.

Figure 3:
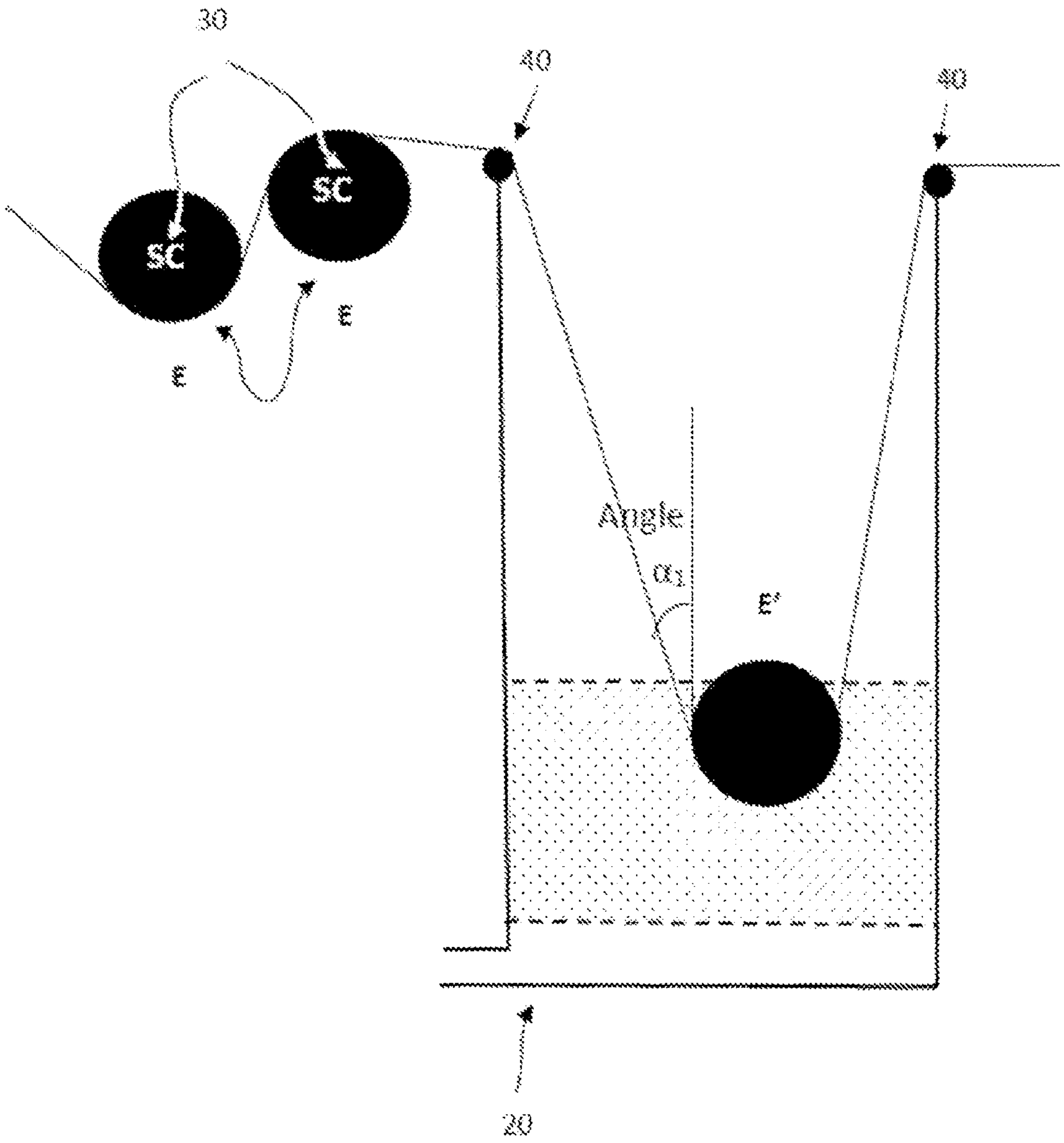

FIG. 3 presents a fluidized bed tank comprising a tension device (E') on which the spread and heated fibrous material circulates to carry out the pre-impregnation, the spreading step being carried out outside the impregnation system and the heating system SC (30) is integrated in the compression rollers (E).

The fibrous material enters and exits the tank by passing over the edge of the tank (40) which may be a fixed or movable roller.

The figure shows two rollers but the invention is not limited to this configuration.

Figure 4:
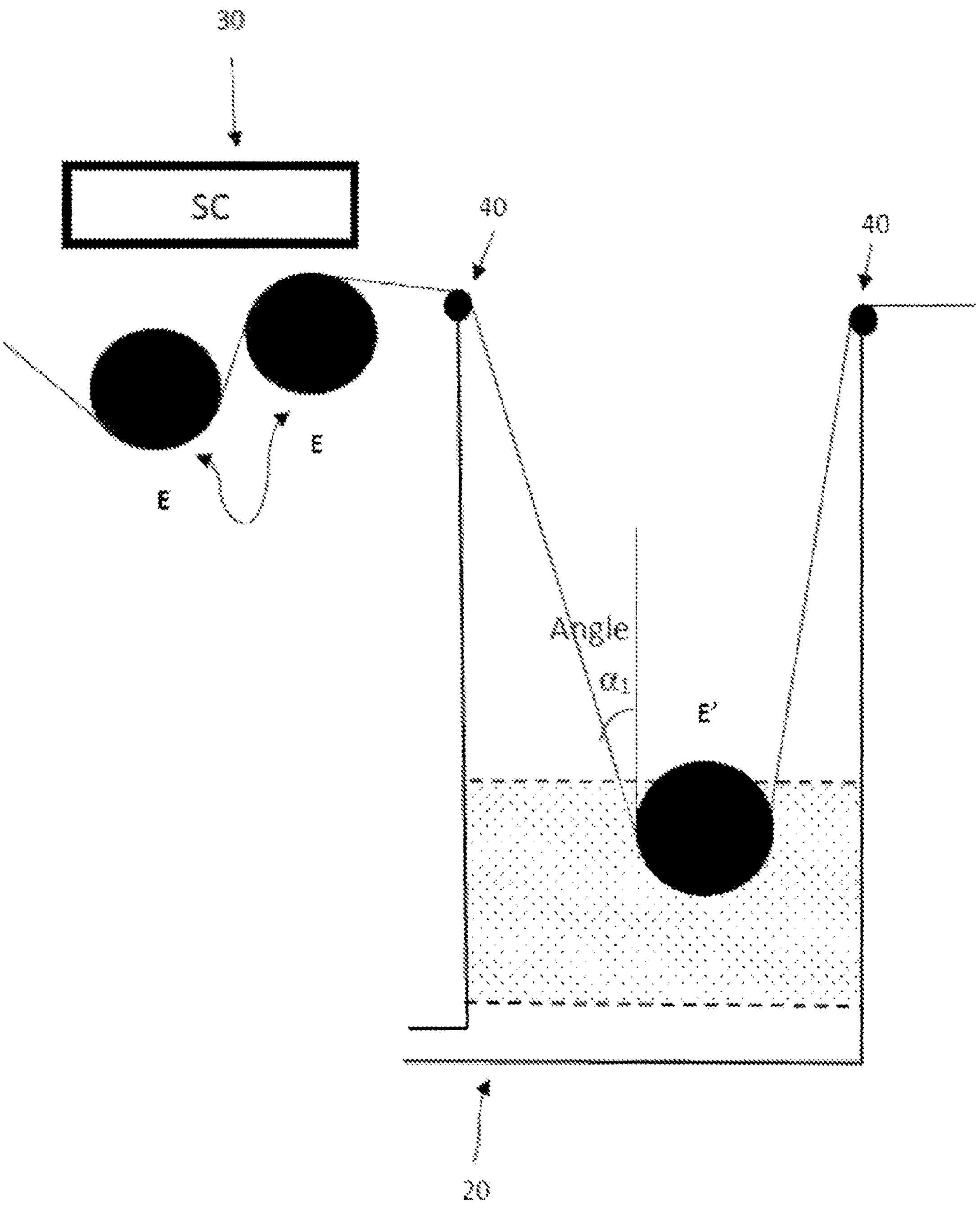

FIG. 4 presents a fluidized bed tank comprising a tension device (E') on which the spread and heated fibrous material circulates to carry out the pre-impregnation, the spreading step being carried out outside the impregnation system and the heating system SC (30), which may be an infrared system, is located above the compression rollers (E).

The fibrous material enters and exits the tank by passing over the edge of the tank (40) which may be a fixed or movable roller.

The figure shows two rollers but the invention is not limited to this configuration.

Figure 5:
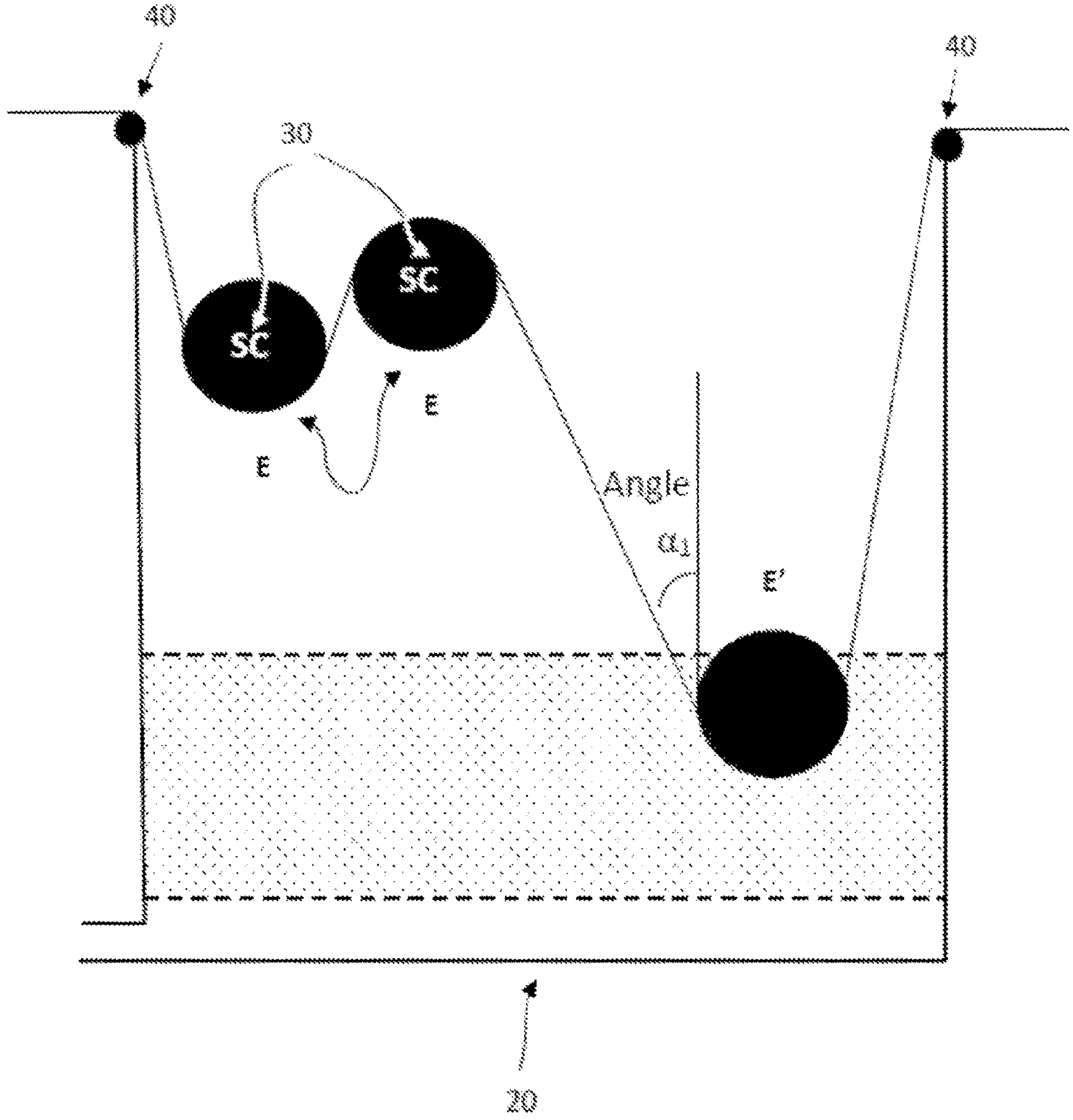

FIG. 5 presents a fluidized bed tank comprising a tension device (E') on which the spread and heated fibrous material circulates to carry out the pre-impregnation, the spreading step being carried out inside the impregnation system and the heating system SC (30) is integrated in the compression rollers (E), which are located above the fluidized bed.

The fibrous material enters and exits the tank by passing over the edge of the tank (40) which may be a fixed or movable roller.

The figure shows two rollers but the invention is not limited to this configuration.

Figure 6:
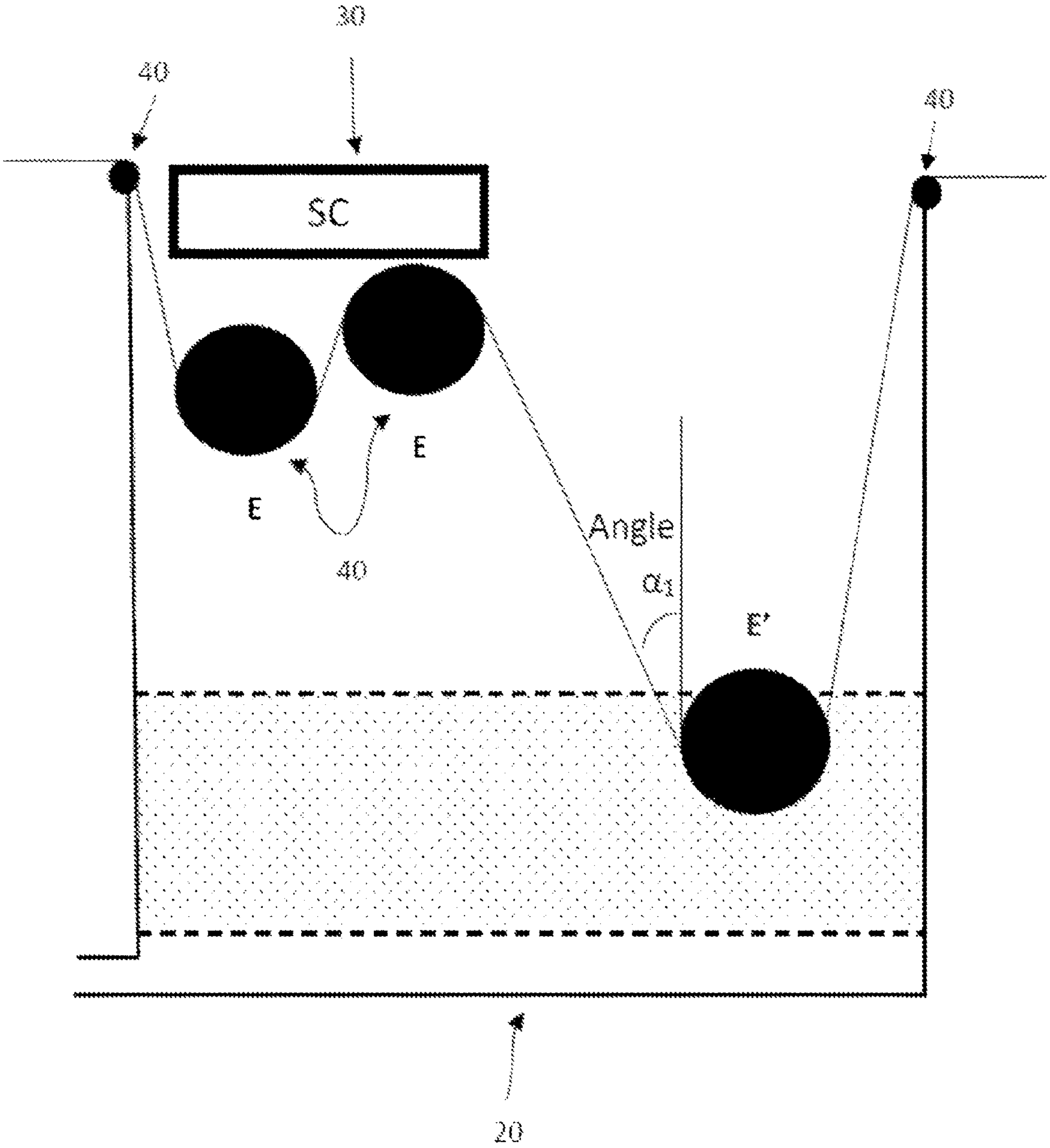

FIG. 6 presents a fluidized bed tank comprising a tension device (E') on which the spread and heated fibrous material circulates to carry out the pre-impregnation, the spreading step being carried out inside the impregnation system and the heating system SC (30), which may be an infrared system, is located above the compression rollers (E), which are located above the fluidized bed.

The fibrous material enters and exits the tank by passing over the edge of the tank (40) which may be a fixed or movable roller.

The figure shows two rollers but the invention is not limited to this configuration.

Figure 7:
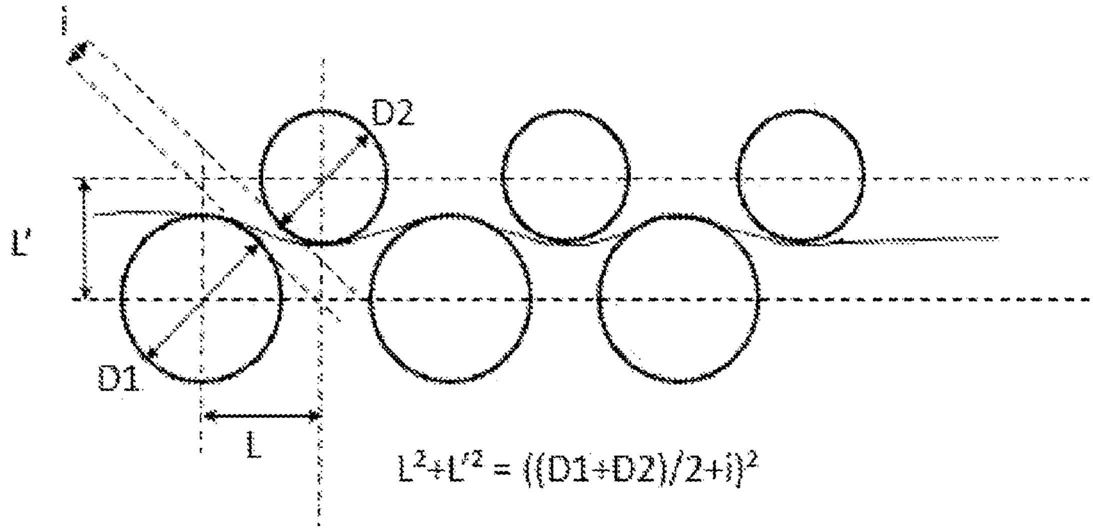

FIG. 7 presents a system of six compression rollers (E) on two levels.

EXAMPLES

Comparative Example 1: Spreading Step Using Six Tension Devices (E) with No Heating System and Located Outside the Pre-Impregnation System The following procedure was carried out:

A system of six smooth cylindrical rollers, distributed as shown in FIG. 7 in two rows of rollers, three being 25 mm in diameter in one row and three other rollers in another row being 20 mm in diameter.

The rollers have a Topocrom® coating.

The system of rollers is located outside the tank.

The distance L between the two sets of upper and lower rollers is equal to 17 mm; the distance L' between two adjacent rollers is equal to 15.2 mm and i=300 μm (calculated by the equation shown in FIG. 7) thus inducing a gap between the rollers of 300 μm for the passage of the roving.

Rovings used: SIGRAFIL® T24-5.0/270-T140 from SGL Technologies GmbH, with a thermoplastic size.

Tension of the roving at the exit of the creel and before encountering the spreading system: 500 g D50=108 μm, (D10=39 μm, D90=194 μm) for the BACT/10T powder.

Edge of the tank equipped with a fixed roller 20 mm in diameter.

The first roller immersed in the fluidization tank is located 24 cm from the fixed roller at the tank inlet.

The width of the roving before and after the spreading system is measured using a Keyence LED measuring system. An equivalent system is positioned to measure the width of the roving at the fluidization bath inlet.

The data obtained are as follows:

TABLE 1

| Material | Width of the roving (mm) Inlet of the system with six tension devices | Outlet of the system with six tension devices | Fluidization tank inlet |
|---|---|---|---|
| SIGRAFIL ® T24-5.0/270-T140, SGL Technologies GmbH, with a thermoplastic size | 9-12 mm | 15-18 mm | 15-19 mm |

Comparative Example 2: Spreading Step Using an Infrared Heating System Located Outside the Pre-Impregnation System and with No Tension Devices (E)

The following procedure was carried out:

A linear shortwave infrared heating system (mono-radiant having a power of 3 kW maximum with power variator) is positioned horizontally outside the tank.

The fibre roving passes under the module at a distance of 5 cm from the emitter.

Rovings used: SIGRAFIL® T24-5.0/270-T140 from SGL Technologies GmbH, with a thermoplastic size.

Tension of the roving at the exit of the creel and before passing under the infrared module: 500 g D50=108 μm, (D10=39 μm, D90=194 μm) for the BACT/10T powder.

Edge of the tank equipped with a fixed roller 20 mm in diameter.

The first roller immersed in the fluidization tank is located 24 cm from the fixed roller at the tank inlet.

The width of the roving before and after the IR heating system is measured using a Keyence LED measuring system. An equivalent system is positioned to measure the width of the roving at the fluidization bath inlet.

The data obtained are as follows:

TABLE 2

| Material | Width of the roving (mm) Inlet of the system with no tension devices | Outlet of the system with no tension devices | Fluidization tank inlet |
|---|---|---|---|
| SIGRAFIL ® T24-5.0/270-T140, SGL Technologies GmbH, with a thermoplastic size | 9-12 mm | 10-12 mm | 10-13 mm |

Example 3 (Invention): Spreading Step Using Six Tension Devices (E) with an IR Heating System Outside the Pre-Impregnation System The following procedure was carried out:

A system of six smooth cylindrical rollers, distributed as shown in FIG. 7 in two rows of rollers, three being 25 mm in diameter in one row and three other rollers in another row being 20 mm in diameter.

The rollers have a Topocrom® coating.

A linear shortwave infrared heating system (mono-radiant having a power of 3 kW maximum with power variator) positioned horizontally is placed above the system of tension devices outside the pre-impregnation system.

The fibre roving passes through the system of tension devices and thus under the module at a distance of 5 cm from the IR emitter.

The distance L between the two sets of upper and lower rollers is equal to 17 mm; the distance L' between two adjacent rollers is equal to 15.2 mm and i=300 μm (calculated by the equation shown in FIG. 7) thus inducing a gap between the rollers of 300 μm for the passage of the roving.

Edge of the tank equipped with a fixed roller 20 mm in diameter.

Tension of the roving after contact with the tank inlet roller 20 mm in diameter and before encountering the spreading system located in the tank: 500 g The width of the roving before and after the spreading system is measured using a Keyence LED measuring system. An equivalent system is positioned to measure the width of the roving at the fluidization bath inlet.

Rovings used: SIGRAFIL® T24-5.0/270-T140 from SGL Technologies GmbH, with a thermoplastic size.

D50=108 μm, (D10=39 μm, D90=194 μm) for the BACT/10T powder.

The data obtained are as follows:

TABLE 3

| | Width of the roving (mm) | | |
|---|---|---|---|
| Material | Inlet of the system with six tension devices with heating | Outlet of the system with six tension devices with heating | Fluidized bed inlet |
| SIGRAFIL ® T24-5.0/270-T140, SGL Technologies GmbH, with a thermoplastic size | 9-12 mm | 26-30 mm | 27-30 mm |

Example 4 (Invention): Spreading Step Using Six Tension Devices (E) with an IR Heating System Inside the Impregnation System Above the Fluidized Bed The following procedure was carried out:

A system of six smooth cylindrical rollers, distributed as shown in FIG. 7 in two rows of rollers, three being 25 mm in diameter in one row and three other rollers in another row being 20 mm in diameter.

The rollers have a Topocrom® coating.

A linear shortwave infrared heating system (mono-radiant having a power of 3 kW maximum with power variator) positioned horizontally is placed above the system of tension devices.

The fibre roving passes through the system of tension devices and thus under the module at a distance of 5 cm from the IR emitter.

The system with tension device rollers and associated heating is located in the tank.

The distance L between the two sets of upper and lower rollers is equal to 17 mm; the distance L' between two adjacent rollers is equal to 15.2 mm and i=300 μm (calculated by the equation given in [Math 2]) thus inducing a gap between the rollers of 300 μm for the passage of the roving.

Edge of the tank equipped with a fixed roller 20 mm in diameter.

Tension of the roving after contact with the tank inlet roller 20 mm in diameter and before encountering the spreading system located in the tank: 500 g The first roller immersed in the fluidization tank is located 16 cm from the last roller of the spreading system.

The width of the roving before and after the spreading system is measured using a Keyence LED measuring system. An equivalent system is positioned to measure the width of the roving at the fluidization bath inlet.

Rovings used: SIGRAFIL® T24-5.0/270-T140 from SGL Technologies GmbH, with a thermoplastic size.

D50=108 μm, (D10=39 μm, D90=194 μm) for the BACT/10T powder.

The data obtained are as follows:

TABLE 4

| | Width of the roving (mm) | | |
|---|---|---|---|
| Material | Inlet of the system with six tension devices with heating | Outlet of the system with six tension devices with heating | Fluidized bed inlet |
| SIGRAFIL ® T24-5.0/270-T140, SGL Technologies GmbH, with a thermoplastic size | 9-12 mm | 26-30 mm | 27-30 mm |

The invention claimed is:

1. A method for manufacturing an impregnated fibrous material comprising a fibrous material made of continuous fibres and at least one thermoplastic polymer matrix, characterized in that said fibrous material is sized by a sizing thermoplastic polymer and has, before its pre-impregnation with said thermoplastic polymer, an initial width, said method comprising a step of spreading said fibrous material before a pre-impregnation step, said spreading step being carried out by means of at least two tension devices and at least one heating system for heating said tension devices and/or said fibrous material, said spreading, after said fibrous material has passed in contact with said tension devices, being between 1.5 and 5 times the initial width, said spread fibrous material being cooled below a Tg of the sizing thermoplastic polymer by means of a cooling system before it is placed in contact with said thermoplastic polymer matrix in a pre-impregnation system to carry out the pre-impregnation step, the spreading being consistent and always representing 1.5 to 5 times the initial width when said fibrous material is placed in contact with said thermoplastic polymer matrix in the pre-impregnation system.

2. The method as claimed in claim 1, characterized in that the heating system and the at least two tension devices are located outside or inside the pre-impregnation system.

3. The method as claimed in claim 1, characterized in that the heating system and the at least two tension devices are located outside the pre-impregnation system and said pre-impregnation step is carried out with a system chosen from among a fluidized bed, spraying through a nozzle, aqueous dispersion and a molten route.

4. The method as claimed in claim 1, characterized in that the heating system and the at least two tension devices are located inside the pre-impregnation system and said pre-impregnation step is carried out with a system chosen from among a fluidized bed, spraying through a nozzle and aqueous dispersion.

5. The method as claimed in claim 1, characterized in that said at least two tension devices conduct heat and the heating system is present and integrated in said at least two tension devices.

6. The method as claimed in claim 1, characterized in that said at least two tension devices conduct heat and the heating system is present above said at least two tension devices for heating the fibrous material and said at least two tension devices.

7. The method as claimed in claim 5, characterized in that said at least two tension devices conduct heat and a first heating means is present and integrated in said at least two tension devices and a second heating means is present above said at least two tension devices for heating the fibrous material and said at least two tension devices.

8. The method as claimed in claim 7, characterized in that at least one of the tension devices may be cooled to control a temperature of the fibrous material.

9. The method as claimed in claim 1, characterized in that said at least two tension devices do not conduct heat and a heating means is present above said at least two tension devices for heating the fibrous material.

10. The method as claimed in claim 1, characterized in that the at least two tension devices are compression rollers of convex, concave or cylindrical shape.

11. The method as claimed in claim 10, characterized in that the number of rollers in contact with said fibrous material ranges from 2 to 20.

12. The method as claimed in claim 10, characterized in that said compression rollers are in co-rotation and/or in counter-rotation.

13. The method as claimed in claim 10, characterized in that said compression rollers are vibrating.

14. The method as claimed in claim 10, characterized in that said compression rollers have a surface treatment and/or an apparent surface roughness minimizing friction with the fibrous material.

15. The method as claimed in claim 10, characterized in that said rollers are separated from one another by a distance of less than 30 cm.

16. The method as claimed in claim 1, characterized in that said thermoplastic polymer is a non-reactive thermoplastic polymer.

17. The method as claimed in claim 16, characterized in that it the method comprises a step of heating the pre-impregnated fibrous material to melt the thermoplastic polymer of the matrix and to finalize the impregnation of said fibrous material.

18. The method as claimed in claim 1, characterized in that said thermoplastic polymer of the matrix is a reactive prepolymer capable of reacting with itself or with another prepolymer, as a function of chain ends borne by said prepolymer, or else with a chain extender.

19. The method as claimed in claim 18, characterized in that it the method comprises a step of heating the pre-impregnated fibrous material to melt and polymerize the thermoplastic prepolymer of the matrix optionally with said extender and to finalize the impregnation of said fibrous material.

20. The method as claimed in claim 1, characterized in that said at least one thermoplastic polymer of the matrix is selected from: poly(aryl ether ketone)s, (PAEKs); poly(aryl ether ketone ketone)s, (PAEKKs); aromatic polyetherimides (PEIs); polyaryl sulphones; polyaryl sulphides; polyamides (PAs); polyether block amides (PEBAs); polyacrylates; polyolefins; polylactic acid (PLA); polyvinyl alcohol (PVA); and fluoropolymers; and blends thereof.

21. The method as claimed in claim 1, characterized in that said at least one thermoplastic polymer of the matrix is a polymer having a glass transition temperature Tg≥80° C., or a semicrystalline polymer having a melting temperature Tm≥150° C.

22. The method as claimed in claim 1, characterized in that said at least one thermoplastic polymer of the matrix is selected from polyamides, PEKK, PEI, and a blend of PEKK and PEI.

23. The method as claimed in claim 16, characterized in that the content of fibres in said impregnated fibrous material is from 45% to 65% by volume.

24. The method as claimed in claim 16, characterized in that the degree of porosity in said impregnated fibrous material is less than 10%.

25. The method as claimed in claim 1, characterized in that said thermoplastic polymer of the matrix further comprises carbon-based fillers.

26. The method as claimed in claim 1, characterized in that said fibrous material comprises continuous fibres selected from fibres of mineral origin, natural fibres, or amorphous thermoplastic fibres having a glass transition temperature Tg above the Tg of said thermoplastic polymer of the matrix or of said blend of polymers when the latter is amorphous or above the Tm of said thermoplastic polymer of the matrix or of said blend of polymers when the latter is semicrystalline, or semicrystalline thermoplastic fibres having a melting temperature Tm above the Tg of said thermoplastic polymer of the matrix or of said blend of polymers when the latter is amorphous or above the Tm of said thermoplastic polymer of the matrix or of said blend of polymers when the latter is semicrystalline, or a mixture of two or more of said fibres.

27. A use of the method as defined in claim 1, for the manufacture of calibrated tapes suitable for the manufacture of three-dimensional composite parts, by automated layup of said tapes using a robot.

28. The use as claimed in claim 27, characterized in that said composite parts relate to a field selected from the group consisting of transport, oil and gas, hydrogen, gas storage; renewable energy; thermal protection panels; sports; and leisure.

* * * * *